Patented Oct. 6, 1953

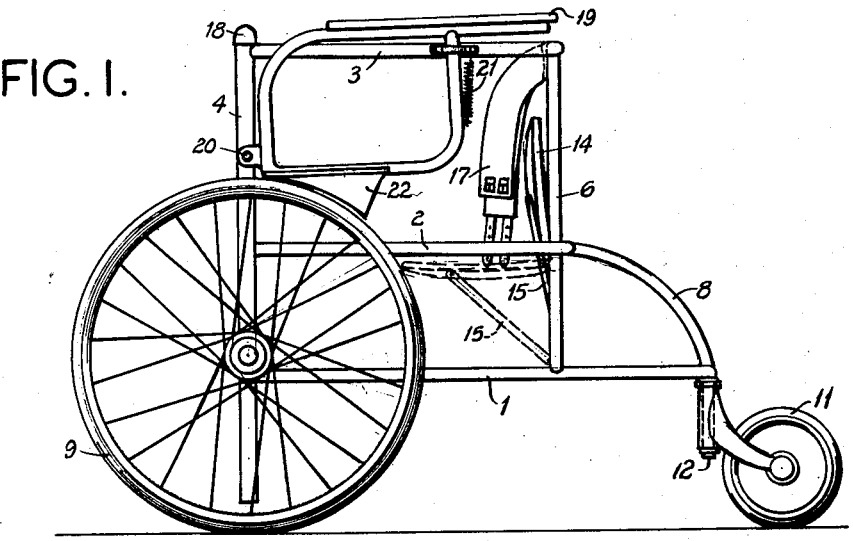
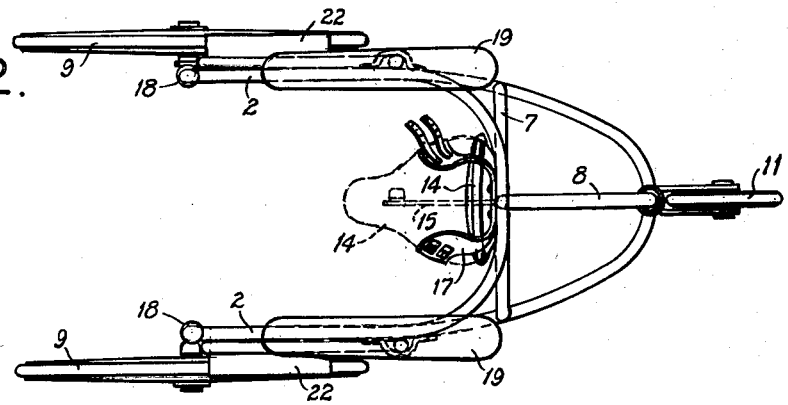
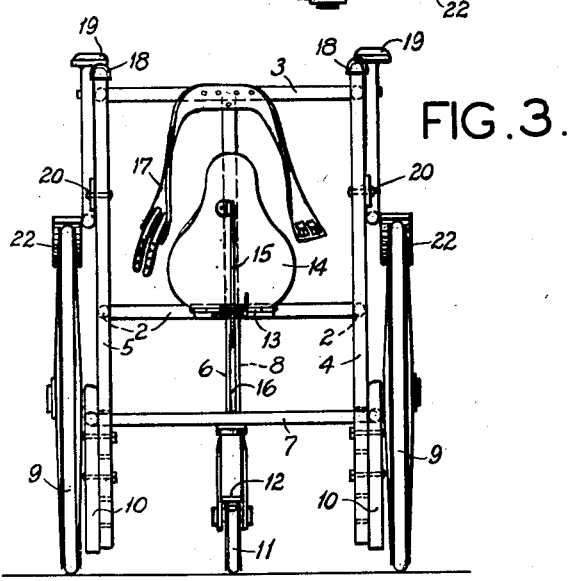

2,654,416

UNITED STATES PATENT OFFICE 2,654,416

WALKER FOR INVALIDS

Pietro Maniscalco, St. Louis, Mo.

Application October 3, 1951, Serial No. 249,553

3 Claims. (Cl. 155—24)

This invention pertains to vehicles of the type known as "walkers" designed to assist invalids or convalescents to regain the ability to walk after a period of illness.

An object of this invention is to provide such a vehicle with additional safety features.

Another object is to provide such a vehicle which may be used outdoors or on uneven ground.

In accordance with this invention, generally stated, the vehicle has a frame generally U-shaped in plan and arranged to be entered by the patient from the front. A pair of large road wheels at the front and a swingable tail wheel under the vehicle permit it to be easy to propel and to steer. A foldable seat within the frame and a belt to be fastened about the patient provide for his safety against falling. Additional safety is provided by brakes applied to the front road wheels and actuated by the patient's weight applied to a pair of arm rests on the upper portion of the frame.

A preferred embodiment of this invention is illustrated in the accompanying drawing, in which Figure 1 is a side elevation of a walker embodying this invention, Figure 2 is a plan view of the same, and Figure 3 is a front elevation of the same.

In the embodiment illustrated in the drawing the frame of the vehicle is built up of metal tubing or the like, welded or otherwise secured at the joints. A lower frame member 1 is U-shaped in plan view and arranged with its open end at the front. An intermediary frame member 2 and an upper member 3 are also U-shaped but somewhat shorter than the member 1. The members 1, 2 and 3 are all connected at their forward ends, in vertically spaced relation to each other, to a pair of upright members 4 and 5. The members 2 and 3 are connected at their rear portions to an upright member 6 which, in turn, rests at its lower end on a transverse member 7 spanning the lower member 1 and secured thereto at its ends. The member 6 is braced laterally by an arcuate member 8 connected at its lower end to the rear portion of the member 1. This assembly provides a U-shaped vehicle frame open at its front so that the patent may enter it from the front, and is made tall enough to fit the particular patient who is to use it.

A pair of large-diameter road wheels 9 supports the front portion of the vehicle frame. Each wheel is mounted on an axle secured to a member 10, which members are secured to the uprights 4 and 5. The wheels 9 are road wheels in the sense that they are large enough to roll easily over irregularities of the ground, as distinguished from mere casters, so that the walker may be used out of doors. The rear portion of the frame is supported by a tail wheel 11 arranged to be swingable on a pivot 12 on the frame, i. e. the pivot 12 is offset from the center of the wheel 11 so that when the rear of the frame is moved to one side the wheel will swing on the pivot 12 to follow such movement.

Mounted by a hinge 13 on the intermediate portion of the vehicle frame is a seat 14 supported, when in position for use, by a brace 15 pivoted to said seat and slidable at its lower end in a slot 16 in the frame member 6. The seat is thus foldable upward to the position shown in full lines in Fig. 2 when not in use, or lowered to the position shown in broken lines in that figure for use. A suitable catch, not shown, may be provided to hold the seat in its folded position.

A belt 17, secured to the rear upper portion of the frame, may be provided to be fastened about the patient when necessary as an additional precaution against falling. This belt is positioned so that it may be used either while the patient is seated on the seat 14 or while he is standing on the ground with the seat folded up.

The tops of the uprights 4 and 5 may be provided with rounded heads 18 to provide handholds for propelling and steering the walker. In addition, however, a pair of arm rests 19 are pivoted at 20 to the uprights 4 and 5. Each arm rest is normally supported by a spring 21, only one of which springs appears in the drawing. Attached to the lower portion of each arm rest is a brake shoe 22 arranged adjacent the wheel 9 on its side of the frame. As may be seen from Fig. 1, downward pressure on the arm rest 19 sufficient to overcome the tension of the spring 21 will cause said arm rest to move on the pivot 20 so as to bring the shoe 22 into engagement with the wheel 9 to brake the same. The tension of the springs 21 may be adjusted to such value as to support the weight of the patent's arms resting normally thereon. By applying his weight to said arm rests the patient may then apply the brakes to either or both of the wheels 9.

It will be seen, therefore, that this invention provides a safe, simple and rugged walker for the use of patients of this class. Having large road wheels, it is easy to propel and the swingable tail wheel makes it easy to steer. The foldable seat permits the patient to rest when necessary and folds out of the way when he desires to walk. The belt 17 may be used to insure against his falling out of the vehicle, and may also assist in propelling the same. In case of any unusual occurrence the vehicle is under control by the brakes which, since they act on large wheels are quick and sure in their action. The combination of the brakes with the arm rests not only makes them easy to operate but, in case the patient should fall or, as sometimes happens, should lose muscular control, his weight will fall upon the arm rests 19 and instantly brake the vehicle to a stop.

I claim:

1. A walker for invalids comprising, a U-shaped frame open at the front, a pair of road wheels supporting the front portion of said frame, a tail wheel supporting the rear portion of said frame, an arm rest pivoted on the upper portion of said frame, and a brake connected with said arm rest and engageable with one of said wheels whereby downward pressure on said arm rest causes engagement of said brake with said wheel.

2. A walker for invalids comprising, a U-shaped frame open at the front, a pair of road wheels supporting the front portion of said frame, a tail wheel supporting the rear portion of said frame, an arm rest pivoted on the upper portion of said frame, a brake connected with said arm rest and engageable with one of said wheels, and a spring normally keeping said brake disengaged from the wheel, whereby downward pressure on said arm rest sufficient to overcome the tension of said spring will move said brake into engagement with the wheel.

3. A walker for invalids comprising, a U-shaped frame open at the front, a pair of road wheels supporting the front portion of said frame, a tail wheel supporting the rear portion of said frame, arm rests pivoted on the upper side portions of said frame, brakes connected to said arm rests and engageable with said road wheels, springs normally keeping said brakes disengaged from the wheels, a foldable seat mounted within said frame, and a belt secured to said frame adapted to be fastened about the patient seated on said seat.

PETE MANISCALCO.

References Cited in the file of this patent

UNITED STATES PATENTS

| Number | Name | Date |
|---|---|---|
| 944,020 | DeCamp | Dec. 21, 1909 |
| 1,917,440 | Finkbeiner | July 11, 1933 |
| 2,077,569 | Kish | Apr. 20, 1937 |
| 2,324,421 | Ouelette | July 13, 1943 |
| 2,362,466 | Carter | Nov. 14, 1944 |

FOREIGN PATENTS

| Number | Country | Date |
|---|---|---|
| 1,743 | Great Britain | 1879 |
| 248,434 | Germany | June 22, 1912 |